No. 670,071.  
G. T. WILLIS.  
HARROW TOOTH FASTENING.  
(Application filed Sept. 5, 1900.)

Patented Mar. 19, 1901.

(No Model.)

Witnesses.  
T. E. Monteverde.  
Walter F. Vane.

Inventor.  
Glenn T. Willis,  
by Wm. F. Booth,  
his Attorney.

THE NORRIS PETERS CO., PHOTO-LITHO., WASHINGTON, D. C.

UNITED STATES PATENT OFFICE.

GLENN T. WILLIS, OF FRESNO, CALIFORNIA, ASSIGNOR TO JAMES PORTEOUS, OF SAME PLACE.

HARROW-TOOTH FASTENING.

SPECIFICATION forming part of Letters Patent No. 670,071, dated March 19, 1901.

Application filed September 5, 1900. Serial No. 29,105. (No model.)

*To all whom it may concern:*

Be it known that I, GLENN T. WILLIS, a citizen of the United States, residing at Fresno, county of Fresno, and State of California, have invented certain new and useful Improvements in Harrow-Tooth Fastenings; and I do hereby declare the following to be a full, clear, and exact description of the same.

My invention relates to the class of devices for securing or fastening harrow-teeth to their carrying-bars.

The severe strain to which harrow-teeth are subjected renders it necessary that their fastenings shall be strong. At the same time the necessity for removing broken or worn ones and the substitution of fresh teeth and the necessity for removing the teeth to sharpen them require that the fastening be one which may be readily made and broken.

It is the object of my invention to provide a fastening which shall answer these conditions or requirements—namely, strength and ease of manipulation.

My invention consists in the novel construction and combination of parts, which I shall now describe by reference to the accompanying drawings, in which—

Figure 1:
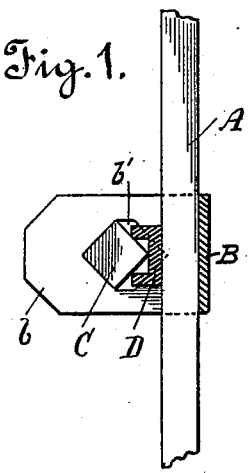
Figure 2:
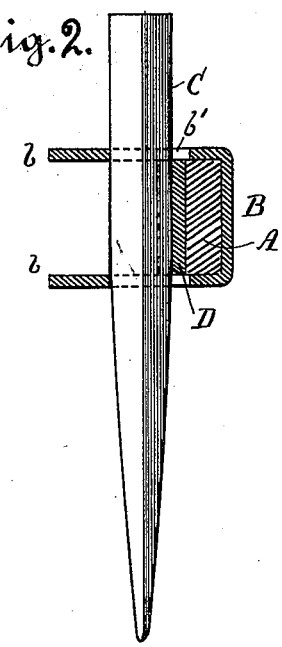

Figure 1 is a top view of my fastening, the top arm of the clip being removed. Fig. 2 is a cross-section showing both arms of the clip.

A is a portion of a harrow-bar.

B is a clip embracing one side and the top and bottom edges of the bar and having the top and bottom arms $b$, in which are the holes $b'$.

C is the harrow-tooth, consisting of a tapering piece. This tooth is fitted down through the holes $b'$ of the clip B.

D is a grooved bearing-piece fitted between the tooth and the inner face of bar A and lying between the top and bottom arms of clip B. On account of the taper of the tooth it becomes wedged the tighter in its holes and in the groove of the bearing-piece D the harder it is driven down. At the same time the tooth can be readily driven out by blows upon its point.

This fastening is further advantageous in that it can be placed anywhere upon the bar without reference to previously selected or prepared places, as is the case where holes in the bar itself are used as seats for the teeth. Moreover, it does not weaken the bar, and the outer side of the clip being so close to the bar and nearly flush therewith there is no liability in a rotary harrow used close up to trees of barking or injuring the trees.

In case the tooth should become loose a suitable washer can be placed behind it or on the outer side of the bar under the clip, which will tighten the tooth again.

As in practice the tooth used is angular in cross-section and is fitted to place with its angles for the bearing-lines, the mutual grip and binding of all the parts become more pronounced. The housing of the grooved bearing-piece D within the clip disposes of it effectually, leaving no projecting ends for interference by weeds, trash, &c. It requires no driving, not being a wedge, but is simply placed in position, the tooth alone being driven to place.

By driving the tooth down to its seat it wedges not only itself, but by its bearing against the grooved piece D it tightens up the clip to the bar and holds said clip firmly. It is obvious that to enable the clip to be thus tightened up the holes in its arms must be sufficiently larger than the tooth to permit this tightening movement of the clip to the bar.

Having thus described my invention, what I claim as new, and desire to secure by Letters Patent, is—

In combination with a tapering harrow-tooth, and the carrying-bar for the same, the clip embracing the bar, and having the holes through its arms, for receiving the tooth, and the grooved bearing-piece fitted to the bar and housed between the clip-arms, and seating the tooth in its groove.

In witness whereof I have hereunto set my hand.

GLENN T. WILLIS.

Witnesses:
 FRANCIS ROBB,
 W. J. KITTRELL.